United States Patent [19]

Keyes, IV et al.

[11] 4,450,722
[45] May 29, 1984

[54] WATER LEVEL GAUGE WITH FAULT DETECTOR

[75] Inventors: Marion A. Keyes, IV, Chagrin Falls, Ohio; Richard A. Salmen, deceased, late of Canfield, Ohio, by Marie P. Salmen, executrix

[73] Assignee: The Babcock & Wilcox Company, New Orleans, La.

[21] Appl. No.: 402,188

[22] Filed: Jul. 26, 1982

[51] Int. Cl.³ .................................... G01F 23/28
[52] U.S. Cl. .................................... 73/293; 250/577; 340/619
[58] Field of Search ............ 73/293, 323; 340/619; 250/577; 307/471, 442

[56] References Cited

U.S. PATENT DOCUMENTS

| | | | |
|---|---|---|---|
| 3,548,657 | 12/1970 | Panerai et al. | 73/293 |
| 3,851,181 | 11/1974 | Heule | 250/577 |
| 4,123,227 | 10/1978 | Heim et al. | 250/577 X |
| 4,344,429 | 8/1982 | Gupton et al. | 250/577 X |
| 4,366,384 | 12/1982 | Jensen | 250/577 X |
| 4,396,911 | 8/1983 | Motsinger et al. | 73/293 X |

FOREIGN PATENT DOCUMENTS

| | | | |
|---|---|---|---|
| 1342444 | 1/1974 | United Kingdom | 250/577 |
| 667815 | 6/1979 | U.S.S.R. | 73/293 |

OTHER PUBLICATIONS

Diamond Power Water Level Gauges and Accessories, 12-1976.

Primary Examiner—Gerald Goldberg
Assistant Examiner—Tom Noland
Attorney, Agent, or Firm—Vytas R. Matas; Robert J. Edwards

[57] ABSTRACT

A water level gauge with fault detector comprises a column for containing a level of water with a plurality of light sources on one side of the column and a plurality of detector assemblies on an opposite side of the column. Filters are utilized to project red and green light through the column. Each detector assembly includes a red detector and a green detector with red and green filters respectively. Due to the difference in offset of light beams transversing the column at an oblique angle through water and through air, the green detector is activated by green light when the green and red light passes through the water in the column and the red detector is activated when the light passes through air in the column, that is, above the water level in the column. By a circuit connected to each detector assembly, it is possible to discover the level of water in the column. Since each detector assembly includes two detectors only one of which must be activated at a time, a false detector is operable to detect any failure in the system whether in the light source or the detectors by verifying that one signal is received from each detector assembly. If no signals are received from a particular detector assembly or two signals are received from a particular detector assembly, this indicates a fault.

10 Claims, 4 Drawing Figures

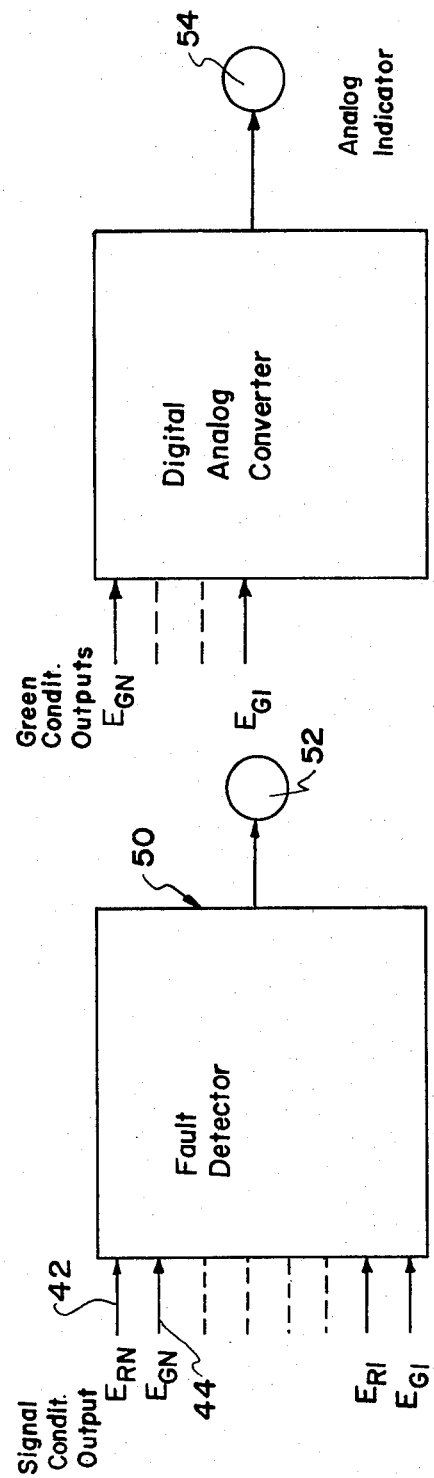

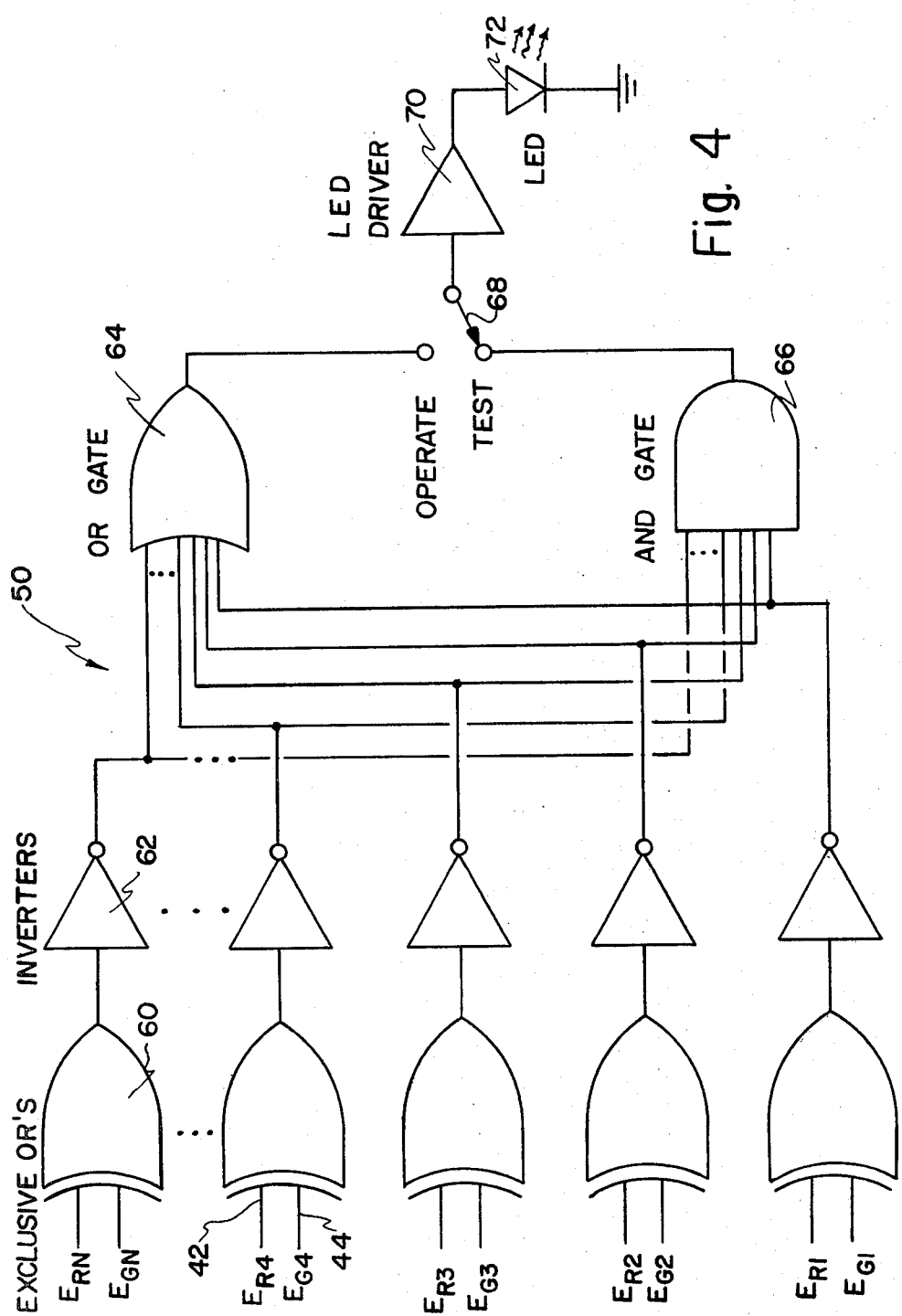

WATER LEVEL GAUGE WITH FAULT DETECTOR

FIELD AND BACKGROUND OF THE INVENTION

The present invention relates, in general, to liquid level gauges and, in particular to a new and useful liquid level gauge which utilizes detector assemblies each including two separate detectors one of which must always be activated during the course of level detection so that a fault can easily be determined by the absence of all signals from a particular detector assembly or the presence of two signals from a particular detector assembly.

Liquid level gauges, in particular, water level gauges for boiler drum water level are known. Such devices utilize a column of colored lights that provide a visual indication of water level. Those lights below the water level are green while those lights above are red. Other means used to indicate drum water level for control purposes consist of a differential manometer or differential diaphragm using a magnetic linkage and both providing means for visual indication of water level on a graduated scale.

Typically, these devices are located about 100 to 500 feet from a control room for controlling the boiler operation. For the remote reading of such level indication devices, an operator must either view the device through a series of mirrors or utilize closed circuit television for viewing the water level indicating device.

One method facilitates remote reading of water level by utilizing fiber optics to transmit optical signals to the control room.

U.S. Pat. No. 3,713,338 to Kind discloses a fiber optics system for water level detection.

The use of different color light in liquid level detection is disclosed in U.S. Pat. No. 3,648,521 to Amendolia. U.S. Pat. No. 3,548,657 to Panerai et al discloses the utilization of phototransducers at a terminating point of a light source to provide a remote electrical indication of water level in a tank.

Many level detecting systems utilize plural detectors so that a multiplexing technique is also useful. U.S. Pat. No. 4,084,426 to Gales discloses a system for scanning a plurality of detectors in monitoring the condition of a fluid within a vertical tube.

SUMMARY OF THE INVENTION

An object of the present invention is to provide a liquid level gauge which permits the convenient remote detection of water level in a column while, at the same time, providing reliable fault detection to maintain the integrity of the system.

Accordingly, another object of the invention is provide a liquid level gauge which comprises a liquid column for containing a level of liquid, light means on one side of the column for shining light having at least a first and a second color through the column, the light of the first color passing through the column relatively readily above the liquid level and the second color light passing through the column relatively readily below the level of liquid, at least one detector assembly on an opposite side of the column for receiving the first and second color light, the detector assembly comprising a first detector sensitive to the first color light a second detector sensitive the second color light so that the detector assembly always includes one activated detector and one non-activated detector, and a detector circuit connected to the detector assembly for indicating the state of the detector assembly.

A still further object of the invention is to provide such a liquid level gauge which includes a fault detector connected to the detector assembly for verifying that one detector is activated and one detector is not activated, and for providing a fault signal when that condition is violated.

Another object of the invention is to provide such a level gauge wherein the light means comprises a plurality of individual light sources each with a filter for filtering out all but red and green light, a plurality of detector assemblies each comprising a pair of detectors and each aligned with respective light sources, each detector assembly having a green light filter in front of a respective second detector and a red light filter in front of a respective first detector.

According to the invention, all the light provided to the column can be supplied by a single light source with the use of a plurality of detector assemblies or, conversely, a single detector assembly can be utilized with a plurality of light sources, with the light sources being activated sequentially to determine a water level.

Each of the detectors in each detector assembly is provided with a signal conditioner for converting the detector signal into a voltage which can be utilized to light either a green or a red lamp at a remote location to provide a visual analogous level display of liquid level in the column, with all indicators below water level showing green and all indicators above water level showing red.

The inventive arrangement also is easily adaptable to computer technology. According to the invention, the signals from the water level gauge can be directly interfaced with computer-based data acquisition systems or with other electric control and operation information systems.

Another object of the invention is to provide a liquid level detector which is simple in design, rugged in construction and economical to manufacture.

For an understanding of the principles of the invention, reference is made to the following description of typical embodiments thereof as illustrated in the accompanying drawings.

BRIEF DESCRIPTION OF THE DRAWINGS

In the Drawings:

FIG. 2 is a simplified block diagram of a fault detector which can be utilized with the system of FIG. 1;

FIG. 3 is a block diagram of a digital to analog conversion arrangement which can be used in accordance with the invention; and FIG. 4 is a schematic representation of the fault detector of FIG. 2 shown in greater detail.

DESCRIPTION OF THE PREFERRED EMBODIMENTS

Figure 1:
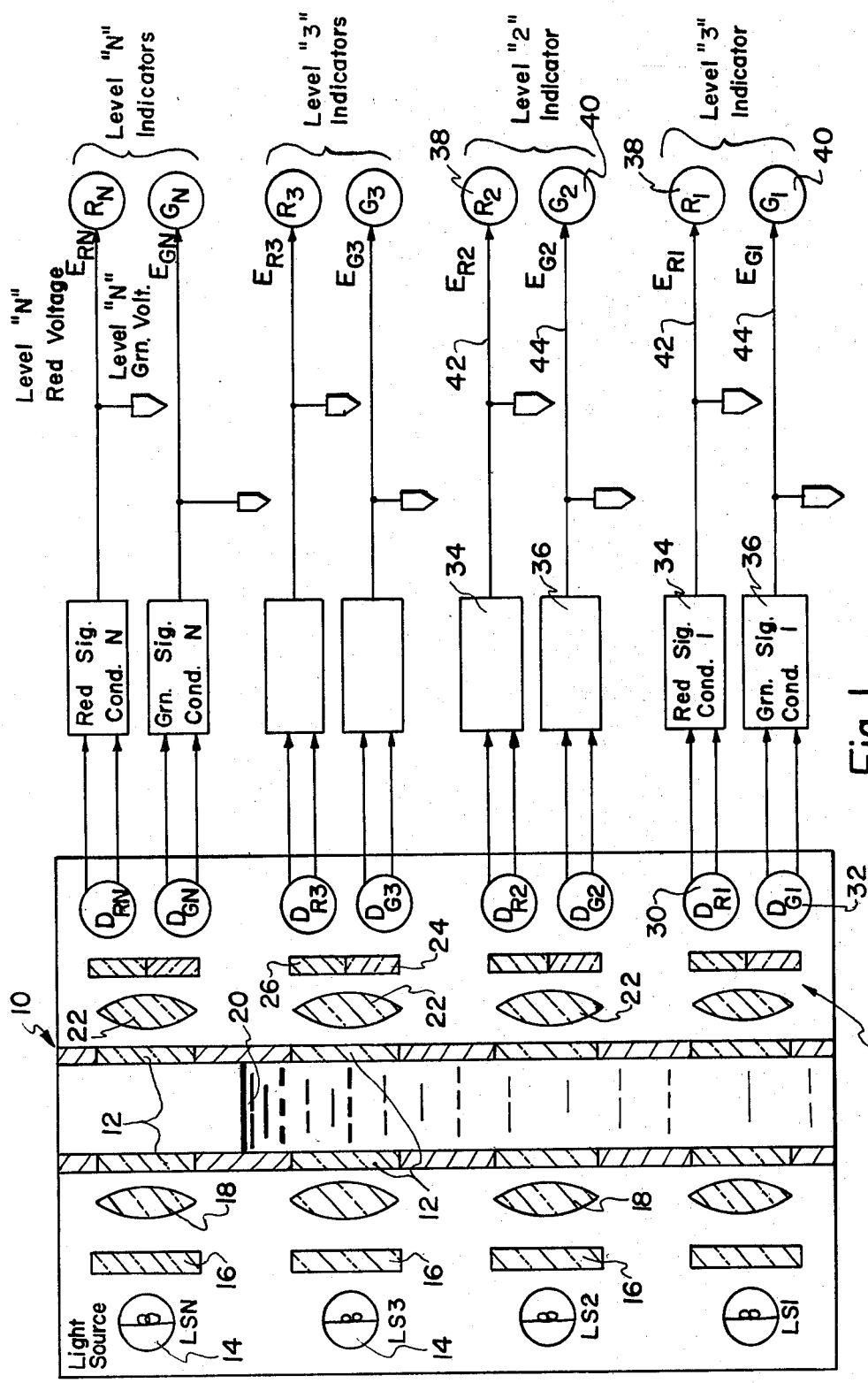
FIG. 1 is a diagram illustrating the inventive liquid level gauge.

Referring to the drawings, in particular, the invention embodied therein in FIG. 1 comprises a liquid level detector, in particular a water level detector which includes a water column generally designated 10 which may be transparent or include a plurality of aligned transparent windows 12. On one side of column 10, a plurality of light sources 14 are provided. A filter 16 and a lens 18 is positioned in front of each light source so that predominantly red and green light passes into the water column through windows 12 facing lenses 18. As is known, a light beam passing through such a water column and at an oblique angle, is offset, so that below the water level 20, in column 10, predominantly green light passes through lenses 22. Above the water level 20 predominantly red light passes through lenses 22. Each photodetector assembly generally designated 28 includes one such lens 22, a red filter 26, a green filter 24 and a pair of detectors 30 and 32. Each detector 32 is a green detector and receives green light through lens 22 and filter 24 when green light passes through the water level in column 10. Each green light detector 32 is thus activated below the water level. Above the water level 20, the red light detectors 30 are activated by red light passing through lenses 22 and filters 26. In this manner, one detector is activated in each detector assembly with the other detector being deactivated. As will be set forth in greater detail hereinunder, this condition provides the possibility for reliable and accurate fault detection for the elements of the system.

The output of each photodetector 30, 32 is fed to a respective signal conditioner 34,36 which provides an output voltage level ($E_{GN}$ on $E_{RN}$) when light is present on its detector. Thus, a red and a green signal conditioner are required for each desired level. The signal conditioners then drive, over lines 42, 44, an array of red and green indicators 38, 40 such that the green indicators are "on" with water present, and the red indicators are "on" with water absent.

In the event of failure of either a light source or a detector, a fault indicator circuit 50 in FIG. 2, provides a warning indication to an operator at an indicator 52. Since only one signal conditioner for each level (either red or green) should be providing an output signal, it is a relatively easy matter to detect when this condition is violated.

If desired, the output of the signal conditioners can be converted to an analog signal (FIG. 3) to provide a meter output (analog indicator 54) of the water level or may be converted to a digital code for input to a digital monitoring and control system.

Multiplexing the signals permits reduction of the number of wires necessary to implement the readout. This may be accomplished in several ways. LED's could be used as pulsed light sources. Lamps 14 could be pulsed or modulated although at a much slower rate. The use of an array of pulsed light sources in conjunction with a single detector would effect multiplexing. Each light source would be pulsed at a different frequency or in a different time slot and synchronous detection used at the other one of the permission link (e.g., at the operator's panel or in a data acquisition or control system) to separate the signals and extract the level information.

A single light source may be used with an array of detectors. The output of the array would then be scanned to determine the level information.

Referring now to FIG. 4, the fault detector 50 according to the invention, comprises an exclusive OR circuit 60 which has a pair of connections for the lines 42,44 only one of which should carry a signal corresponding either to a green or a red light detection. Each exclusive OR circuit 60 is connected to an inverter 62 which inverts the output signal and provides it to one of a plurality of inputs of an OR gate 64 and an AND gate 66. A selector switch 68 is provided for connecting an LED driver circuit 70 selectively to the OR gate 64 or the AND gate 66. LED driver 70 is connected to an LED 72 which produces a light signal upon the occurrence of a fault.

In operation, switch 68 is connected to OR gate 64. With only one of the lines 42,44 carrying a signal into each exclusive OR gate 60, each OR gate produces at its output a "true" or one signal. This signal is provided to the input of inverters 62 and converted to a "false" or zero signal at the output thereof. With all zero or "false" signals provided to OR gate 64, no signal is provided to LED driver 70 and the LED 72 is not activated. If any of the activated detectors fail, the connected exclusive OR gate 60 will receive no signals at either of its inputs and will therefore produce a "false" or zero signal. This signal is inverted by its connected inverter 62 so that a "true" or one signal is provided to OR gate 64 which, in turn, activates LED driver 70 and LED 72. With a failure in any of the light sources, a similar condition occurs.

To test the condition of the circuit, switch 68 is switched to its test position and connected to AND gate 66. AND gate 66 functions to test the integrity of each detector and insure that a detector is not producing an output signal when it should not produce such a signal. This is done by switching all the light sources off. In this condition, all of the exclusive OR gates 60 should produce a zero or false signal which is inverted to a true signal by inverter 62 and activates each input of AND gate 66. LED driver 70 is thus activated which lights LED 72. If LED 72 does not light, this indicates that one detector and one of the detector assemblies is providing a signal when it should not provide such a signal.

The switch 68 may also be used to test the output indicators 38, 40 which are typically LED's or lamps. In a test mode, all level indicating LED's or lamps as well as the failure indicator 72 or 52 must light to pass the test.

While specific embodiments of the invention have been shown and described in detail to illustrate the application of the principles of the invention, it will be understood that the invention may be embodied otherwise without departing from such principles.

What is claimed is:
1. A liquid level gauge comprising:
a liquid column for containing a level of liquid;
light means on one side of said column for obliquely shining light having at least a first and a second color through the column, the light of the first color passing through the column relatively readily above a level of liquid therein and light of the second color passing through the column relatively readily below the level of the liquid therein;
at least one detector assembly on an opposite side of said column for receiving light from said light means, said detector assembly comprising a first detector for generating a first signal when light of said first color shines on said detector assembly and a second detector for generating a second signal when light of said second color shines on said detector assembly; and
a detector circuit connected to said at least one detector assembly for indicating which of said first and second detectors is producing a signal including a fault detector assembly connected to said first and second detectors for indicating a fault when any condition arises other than a condition where a single signal is received from a single one of said first and second detectors.

2. A liquid level gauge according to claim 1, wherein said light means comprises a plurality of light sources spaced along said column.

3. A liquid level gauge according to claim 2, including a red/green filter between each light source and said column, said first color being red and said second color being green.

4. A liquid gauge according to claim 2, including a plurality of detector assemblies spaced along said column with each detector assembly opposite a corresponding light source, a filter between each light source and said column for providing light of said first and second color to said column, each detector assembly comprising a first detector and a second detector, a first filter between each first detector and said column for filtering all but light of said first color and passing light of said first color to said first detector and a second filter between each second detector and said column for filtering all but light of said second color and providing light of said second color to each second detector.

5. A liquid level gauge according to claim 4, wherein said detector circuit includes a fault detector connected to each of said first and second detectors of each of said detector assemblies, said fault detector operable to generate a fault signal upon receiving any except a single signal from each detector assembly.

6. A liquid level gauge according to claim 5, wherein said fault detector comprises an exclusive OR gate connected to each detector assembly having a first input connected to each first detector and a second input connected to each said second detector, an inverter connected to an output of each exclusive OR gate, an OR gate having a separate input connected to each of said inverters and an output, and indicator means connected to OR gate output.

7. A liquid level gauge according to claim 6, including an AND gate having a separate input connected to each of said inverters and an output, a switch connected between each of said OR gate and AND gate outputs and said indicator means for selectively connecting said indicator means to one of said OR and AND gates whereby, with said indicator means connected to said OR gate, a fault during operation can be detected and, with said indicator means connected to said AND gate, a fault can be detected with all of said light sources extinguished.

8. A liquid level gauge according to claim 1, including a plurality of detector assemblies spaced along said column, each detector assembly including a first and second detector.

9. A liquid level gauge according to claim 8, including red/green filter means between said light means and said column for passing red and green light into said column, each detector assembly including a red filter between each first detector and said column and a green filter between each second detector and said column.

10. A liquid level gauge according to claim 1, wherein said detector circuit comprises a first signal conditioner connected to said first detector and a second signal conditioner connected to said second detector, a first light indicator connected to said first signal conditioner and a second light indicator connected to said second signal conditioner.

* * * * *